United States Patent

[11] 3,624,598

| [72] | Inventor | John V. Foster<br>Los Altos, Calif. |
|---|---|---|
| [21] | Appl. No. | 835,058 |
| [22] | Filed | June 20, 1969 |
| [45] | Patented | Nov. 30, 1971 |
| [73] | Assignee | The United States of America as represented by the Administrator of the National Aeronautics and Space Aministration |

[54] MAGNETIC POSITION DETECTION METHOD AND APPARATUS
18 Claims, 17 Drawing Figs.

[52] U.S. Cl. .................................................. 340/26, 244/114
[51] Int. Cl. ..................................................... G08g 5/00
[50] Field of Search ........................................... 340/26, 25; 343/108; 244/114

[56] References Cited
UNITED STATES PATENTS

| 2,224,863 | 12/1940 | Dingley, Jr. .................. | 340/26 |
| 2,338,100 | 1/1944 | Dingley, Jr. .................. | 340/26 |
| 3,160,369 | 12/1964 | Edmison ....................... | 340/26 UX |
| 3,281,780 | 10/1966 | Gunn ........................... | 340/26 |
| 3,460,066 | 8/1969 | Seashore ....................... | 340/26 |

OTHER REFERENCES
Brophy, James J., Basic Electronics for Scientists, (1966) pp. 61– 65.

Primary Examiner—Kathleen H. Claffy
Assistant Examiner—Jan S. Black
Attorneys—Darrell G. Brekke and G. T. McCoy ABSTRACT: A method and apparatus for establishing the position of an aircraft or other vehicle with reference to a predetermined set of coordinates using magnetic field techniques. Magnetic fields are generated by long linear conductors and magnetic dipole means and the ratio of the fields created thereby is measured at a given point to determine the distance between the sources and the given point. In a preferred embodiment, the electrical signals obtained by the apparatus of the invention are used to provide a visual display of the relative position of an aircraft to the runway upon which it is to land and/or a visual or audible indication of the aircraft's position relative to a predetermined glide slope.

Fig_1

Fig_2

Fig_3

INVENTOR
JOHN V. FOSTER

ATTORNEYS

Fig_4

Fig_5

INVENTOR
JOHN V. FOSTER
BY
ATTORNEYS

INVENTOR
JOHN V. FOSTER
ATTORNEYS

Fig. 7

*Fig_9*

|   | LONG DISTANCE | SHORT DISTANCE |
|---|---|---|
| (a) AIRCRAFT HIGH |  106 |  107 |
| (b) AIRCRAFT LOW |  108 |  109 |

*Fig_10*

*Fig_11*

INVENTOR
JOHN V. FOSTER
ATTORNEYS

Fig_12

Fig_13

Fig_14

Fig_15

Fig_16

Fig_17

MAGNETIC POSITION DETECTION METHOD AND APPARATUS

The invention described herein was made by an employee of the United States Government and may be manufactured and used by or for the Government for governmental purposes without the payment of any royalties thereon or therefor.

BACKGROUND OF THE INVENTION

Many techniques and systems have been proposed in the prior art for establishing the position of an air-, land-, or seacraft with reference to a particular set of reference points. Aircraft are perhaps unique in that the ability to land the vehicle under conditions of low or zero visibility and ceiling is one of the most important factors determining the reliability of air travel. When such conditions prevail, it is absolutely necessary that the pilot have at his disposal at all times accurate information regarding the instantaneous position of his aircraft relative to the landing strip.

Blind-landing systems which provide the pilot with information of this nature have been used now for some time. Most of these systems use directional radio beams which are aimed along the runway approach and are intercepted by the aircraft as it prepares to land. Special receiver equipment on board the aircraft generate error signals for display to the pilot so as to direct him to the center of the guidance beam which generally coincides with an optimum glide slope. In many cases, autopilot instruments are provided on board the aircraft which perform an automatic landing sequence in response to the receipt of these error signals.

The instrument landing system (ILS) is perhaps the most common method now in use. The essential elements of this system consist of a runway localizer, glide path equipment, and marker beacons. The runway localizer provides for lateral guidance that enables the airplane to approach the runway from the proper direction.

Another nonmagnetic aircraft guidance method which utilizes radar techniques is referred to as the ground control approach (GCA) system. Generally, the GCA system employs two radars. The first is for general surveillance, and for control of the aircraft traffic pattern in the vicinity of the landing field. The second is a high-resolution short-range set that is used to conduct the actual landing. A survey of the prior art systems is given in the publication "Synthesis of a Multifunctional Tactical Landing System" by G. B. Litchford, technical report AFFDL-TR-67-188.

Magnetic methods have generally been used in the prior art for azimuth control only, although U.S. Pat. No. 2,340,282 also discloses a system using converging conductors and resistor networks to produce a detectable magnetic glide path. The British Blind Landing Experimental Unit (BLEU) system uses two so-called "leader cables" to generate two magnetic fields of different frequencies along two sides of the runway. The center of the runway is indicated by equal strength from each of the two signals. This system and most other present systems are described in the publication NASA CR73093 Avionic Requirements for All-Weather Landing of Advanced SST, volume II, and several alternatives to the BLEU system configurations are disclosed in the U.S. Pat. Nos. 3,079,586, 3,116,473, Re-25,666, 3,274,546 and 3,281,780 to Ross Gunn.

The above prior art systems, however, suffer from certain disadvantages. The ILS and most "beam rider-type systems" involve extensive ground and airborne equipment installations. In addition, these systems generally suffer from problems caused by reflections of the radio frequency energy from nearby surfaces. These reflections cause beam bending, scalloping, and other effects which make the approach path less than ideal. Furthermore, using most of these prior art systems the information obtained during the last 200 feet of altitude of the final approach is usually not sufficiently accurate to allow complete blind landing with any reasonable degree of confidence.

The ground radar systems, such as the GCA systems in particular, suffer from the obvious limitation that the pilot must be directed from the ground during the landing operation. Airborne radar systems require complex onboard radar equipment in order to provide sufficiently detailed data to enable an accurate blind landing. The magnetic systems used by the British as well as those disclosed in the Gunn patents lack a precision range feature.

SUMMARY OF THE INVENTION

The present invention relates generally to a method and apparatus for establishing the position of an aircraft or other vehicle with reference to a predetermined set of coordinates and, more particularly, to a method and apparatus using magnetic field techniques for accurately establishing the position of an aircraft relative to a landing strip and/or predetermined glide slope, and instantaneously providing communicative data in response thereto. Although the subject invention will be equally applicable to air-, land-, and seacraft, particular reference will be made herein to use of the invention as a guidance system for the blind landing of aircraft.

Briefly stated, the basis of this invention resides in the use of magnetic fields generated at fixed points by two different methods, i.e., single-conductor magnetic sources and dipole-type magnetic sources. Since the strength of a magnetic field from an isolated single conductor decreases inversely with the range from the conductor and the field strength of a magnetic field generated by a dipole source decreases as the inverse cube of the range from the dipole source, it is possible to utilize these differing physical characteristics to uniquely provide an accurate determination of the range as well as the relative positioning of the aircraft to the particular sources. This is accomplished by using measurements of the magnetic field strengths from the particular sources and the ratios thereof combined with predetermined information regarding the source locations and magnetic source strengths.

An alternating magnetic field has a number of features which are favorable for a system of aircraft terminal guidance on landing. The primary advantage of a magnetic field system generated by a dipole source over radio frequency propogation is the drop of the magnetic field strength with the inverse cube of distance as contrasted with the electromagnetic wave strength which drops as the inverse square of the distance. This factor provides an advantage in that measurement of the field strength can be a very sensitive measurement of distance. For example, using a dipole system, a change in distance of 2 to 1 causes the magnetic signal to change by a factor of 8. The cube rate of dropoff also has the advantage of reducing the signal to a negligible value at any appreciable distance. Thus, the effect of signals from an airport landing system in accordance with the present invention would be negligible a mile or so away from the runway and would not interfere with other systems.

Another favorable characteristic of the alternate magnetic field is its ease of generation through the use of an alternating current in a long conductor or in a coil or wire. Likewise, the alternating magnetic field can be detected using a relatively simple coil of wire. This factor can be important when it is desirable to reduce the weight and size of airborne equipment.

One advantage of the present invention over the prior art is that the present system is much simpler both as to the nature of the apparatus and the complexity of the required sensors, whether airborne or statically mounted.

Another advantage of the present invention is that the system can be easily made portable for quick installation of remote landing field locations.

Still another advantage of the present invention is that the system is relatively inexpensive as compared with the prior art systems such as ILS, GCA, etc., and is thus particularly attractive for use by small airports.

Still another advantage of the present invention is that it provides a direct measurement of the aircraft's position relative to a predetermined glide slope or a point on the runway beneath the aircraft rather than the indirect data obtained using other systems which obtain this information from the aircraft's position relative to an electromagnetic beam which is generated from a remote point.

Still another advantage of the present invention is that the system provides signals which can be readily displayed on visual display apparatus to provide the pilot with the option of taking reasonable alternative approaches.

Still another advantage of the present invention is that the detected signals can be used in a display which presents a visual representation of the position of the aircraft relative to the ground or a predetermined glide slope.

OBJECTS OF THE INVENTION

It is therefore a principal object of the present invention to provide a method and apparatus for determining the exact position of a vehicle relative to predetermined reference points using magnetic field techniques.

Another object of the present invention is to provide a magnetic system for determining the exact position of an aircraft over a runway or a runway approach by comparing the ratio of the magnetic fields strengths at a given point caused by linear conductor magnetic source means and dipole magnetic source means.

Still another object of the present invention is to provide a relatively inexpensive aircraft landing system which can be made portable and quickly installed to provide accurate landing data for emergency or other special uses.

Still another object of the present invention is to provide a system which uses magnetic techniques to provide instantaneous aircraft position data relative to a given glide path and landing strip so as to enable a pilot to use his judgement in determining the proper approach, much as he does when flying visually.

These and other objects of the present invention will become apparent after having read the following disclosure of the preferred embodiments which makes reference to the several figures of the drawings.

DESCRIPTION OF THE PREFERRED EMBODIMENTS

Figures 1, 2, 3:
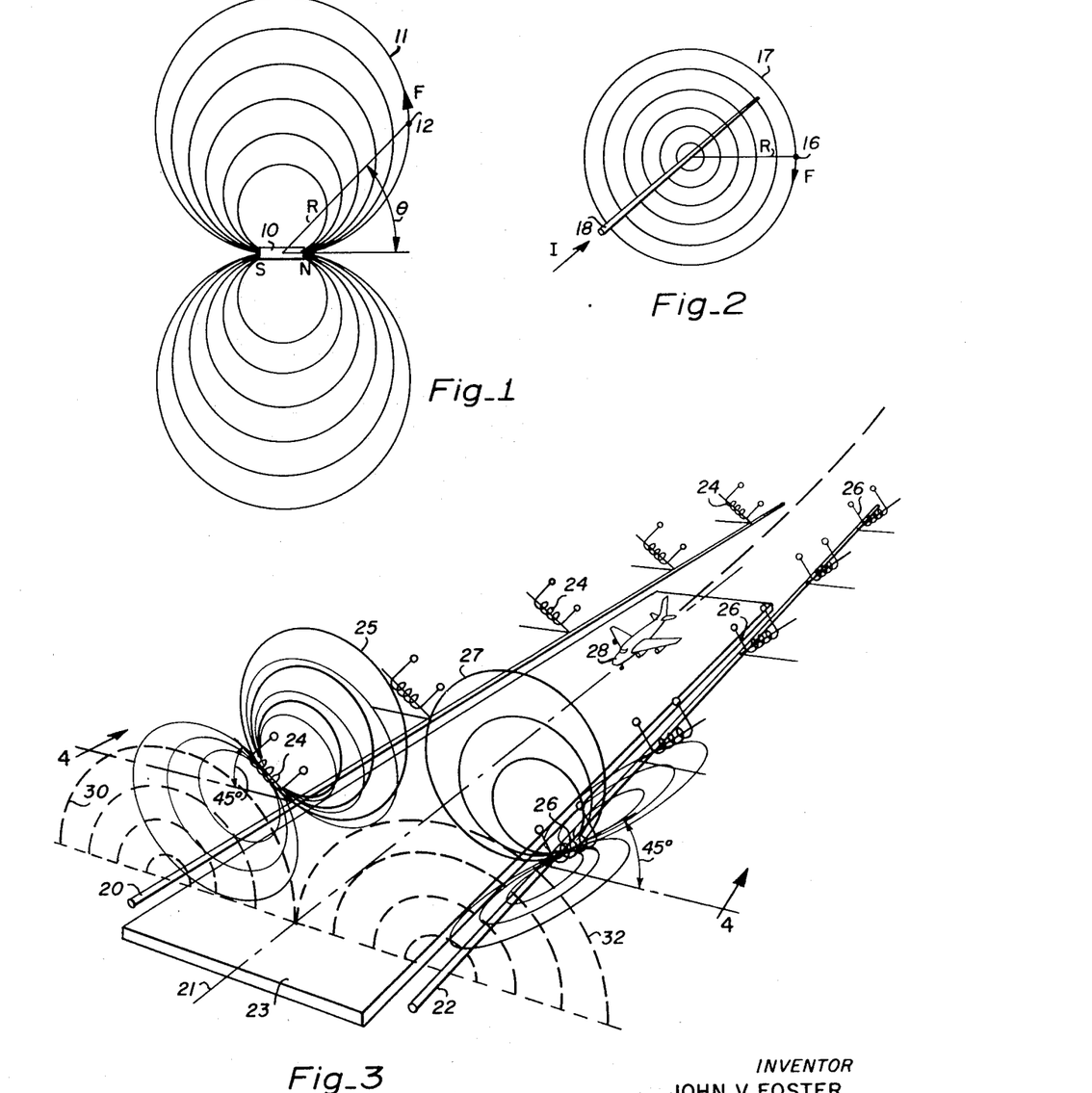
FIG. 1 is a diagram illustrating the magnetic field created by a magnetic dipole.
FIG. 2 is a diagram illustrating the magnetic field created by an elongated electrical conductor.
FIG. 3 illustrates the positioning of the magnetic field generating means along a runway in accordance with the present invention.

Referring now to the drawings, the operative principles which are utilized in the invention are illustrated in FIGS. 1, 2, and 3. In FIG. 1 an axial cross section of a dipole source 10 is illustrated depicting the flux lines lying in the plane of the drawing. Actually, similar lines of flux are common to all planes that contain the longitudinal axis of dipole 10. In short, the many flux lines emanating from the dipole describe a figure of revolution toroidal which is symmetrical about the longitudinal axis of the dipole. The field strength $F$ at a point 12 in the field created by the dipole 10 can be expressed by the equation $$|F|=|M|/R^3\sqrt{3\cos^2\theta+1} \quad (1)$$

where $M$ is the source strength, $R$ is the distance from the source and $\theta$ is the angle between the axis of the dipol 10 and the position vector $F$. In accordance with this equation, it will be recognized that the field strength $F$ at any point in space will vary inversely with the cube of the distance $R$ from the dipole 10. Thus, if the strength of the field generated by dipole 10 is known at the source, then the distance of any point in space remote from the dipole 10 can be determined by measuring the field strength at that point.

Turning now to FIG. 2, the strength of the magnetic field at any point 16 in space relative to a long straight electrical conductor can be determined from the Biot-Savart law, which states that the field strength $F$ at any point 16 located a distance $R$ perpendicular from a long conductor 18 may be determined by the equation $$|F|=Ik/R \quad (2)$$

where $I$ is the current flowing through the conductor and $k$ is a proportionality constant which depends upon the units used. Thus, the flux lines 17 generate cylindrical surfaces coaxial with the conductor 18.

Turning now to FIG. 3 of the drawings, a proposed combination of the long conductor and dipole magnetic sources for use in an aircraft blind-landing system is illustrated. Since the practical maximum range of magnetic fields is limited to less than 1,000 feet, an aircraft would normally be directed into the proposed magnetic system by a standard ILS system which is generally considered accurate above an altitude of about 200 feet.

In this embodiment, a pair of long conductors 20 and 22 are disposed along the edges of a runway 23 parallel to the longitudinal axis 21 of the runway. A plurality of dipole radiators 24 and 26 are respectively positioned on either side of the runway at spaced intervals. In the preferred embodiment, the dipole radiators are cylindrically shaped coils and the longitudinal axis of each coil is simultaneously orthogonal to the runway axis and inclined 45° with respect to the surface of the runway. The inclination of the dipole radiators 24 and 26, and the magnetic fields 25 and 27 generated therefrom is also depicted in FIG. 4 which is a cross section taken along the lines 4—4 of FIG. 3.

By causing an alternating current to be passed through the conductor 20, a time-varying cylindrically shaped magnetic field 30 having an axis common with the conductor 20 will be generated along the right side of the runway 23 as viewed from the aircraft 28. Likewise, an alternating current passed through conductor 22 will cause a time-varying cylindrical magnetic field 32 to be generated about an axis common with the conductor 22 along the left side of runway 23. By similarly energizing dipole radiators 24 spaced along the right side of the runway 23, the plurality of time-varying toroidal-shaped dipole magnetic fields 24 are created. Likewise, by energizing the dipole radiators 26, the set of dipole magnetic fields 27 are generated along the left side of the runway 23.

The energizing current supplied to the dipole sources 24 and 26 may or may not be the same current which is supplied to the single conductors 20 and 22 depending on the particular system used. In event, the fields created by the left and right conductors respectively, and the dipoles on the respective sides of the runway 23 must be separable by an airborne detection apparatus 29 aboard the landing aircraft 28. This can be accomplished by a number of methods. For example, the sources may be excited at different phases relative to a reference phase, or the respective fields may be directionally detected since the fields are vector quantities. In the preferred embodiment, four different alternating current carrier signals are employed —one signal for conductor 20, one signal for conductor 22, one signal for radiators 24, and another signal for radiators 26.

Figure 4:
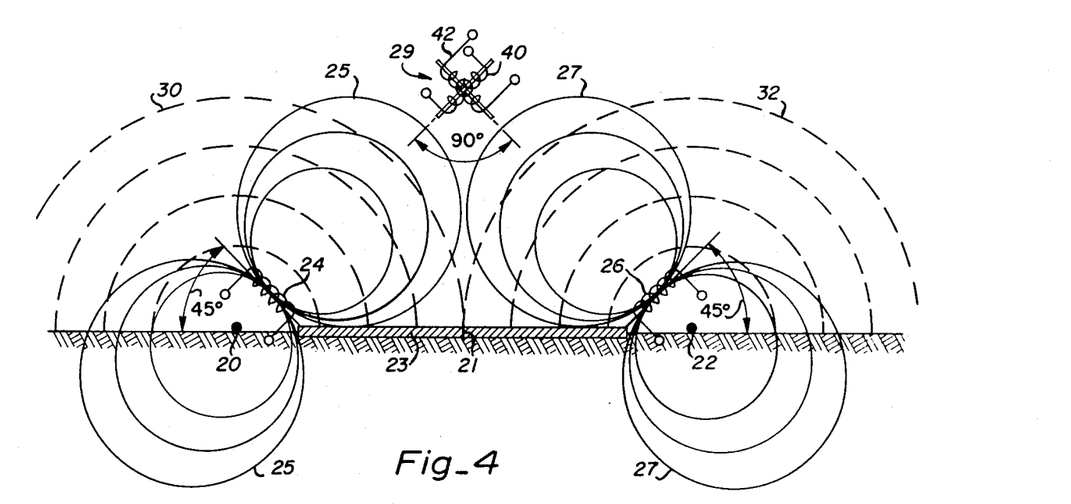
FIG. 4 is a cross section taken along the lines 4—4 of FIG. 3.

As indicated above with reference to FIG. 4, the dashed lines 30 and 32 indicate the magnetic flux lines generated by conductors 20 and 22, respectively, while the solid lines 25 and 27 depict the flux lines emanating from dipole radiators 24 and 26 respectively. The detection apparatus 29 carried aboard the aircraft 28 includes a pair of field detectors 40 and 42 which are orthogonally disposed. The detectors 40 and 42 each have an axis of maximum sensitivity and detector 40 is oriented so as to have maximum sensitivity to the fields generated by conductor 22 and dipole radiators 26 while detector 42, which is perpendicular to detector 40, has maximum sensitivity to the fields produced by conductor 20 and dipole radiators 24.

The magnetic fields radiating from conductors 20 and 22 decrease inversely with the range from the respective conductors while the fields emanating from each of the dipole radiators decrease as the inverse cube of the range from the respective dipole radiators. Since the ratio of the field strengths of the field generated by a dipole radiator 26 and the field generated by conductor 22 is different and fixed for every range from the two magnetic field sources (which are substantially at the same point in space), and the ratio of field strengths of the field generated by a dipole radiator 24 and the field generated by conductor 20 is likewise different and fixed for every distance from the two magnetic field sources, by measuring the ratio of the field strengths of the fields 27 and 32 with detector 40, the distance from the detector 40 (on aircraft 28) to the two magnetic field sources can be determined.

Similarly, by measuring the ratio of the field strengths of the fields 25 and 30 with detector 42, the distance from the detector 42 (on aircraft 28) to the two magnetic field sources can be determined. Once these two ranges are determined, the triangle formed by the detector apparatus 29, conductor 20 and conductor 22 can be used to compute the altitude of the aircraft over the runway 23 and the lateral position of the aircraft relative to the runway 23. Since a ratio is utilized in the range determination, the magnetic detectors need not measure absolute values of field strength. Since one detector is used for measuring both the field strengths comprising a particular ratio, errors caused by the detector (due to drift, aging, etc.) will be common to both numerator and denominator of the ratio and will therefore cancel each other.

Figure 5:
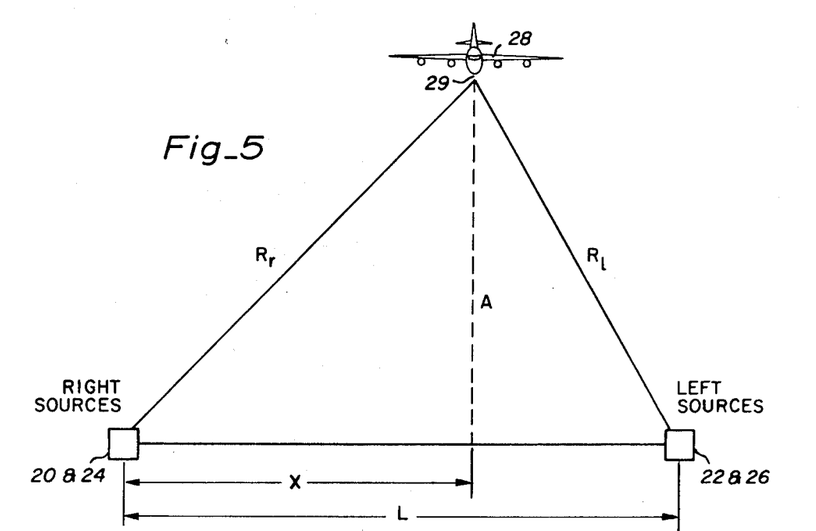
FIG. 5 is a diagrammatic illustration of the parameters measured and utilized in the present invention.

FIG. 5 of the drawings, depicts how the equipment 29 aboard the aircraft 28 can be used to determine the exact position of the aircraft with respect to the runway 23 using both longitudinal conductors 20 and 22 and the dipole radiators 24 and 26. By exciting all the longitudinal conductors and dipole radiators in a coded fashion, the field strength of each source can be selectively detected at aircraft 28. By measuring the ratio of field strengths of the dipole field generated by dipole radiators 24 and the longitudinal field generated by linear conductor 20, the distance $R_r$ between the aircraft 28 and the two magnetic field sources (20 and 24) can be determined. Likewise, by measuring the ratio of field strengths of the dipole field created by dipole radiators 26 and the longitudinal field produced by linear conductor 22, the distance $R_l$ between aircraft 28 and the two magnetic field sources (22 and 26) can be determined. Once the distances $R_r$ and $R_l$ have been measured, the altitude A of the aircraft 28 above the ground and the offset X, i.e., the lateral distance of the aircraft from linear conductor 20, can be easily obtained.

By independently coding either the dipole radiators on the right or those on the left of the runway, or both, the equipment on board aircraft 28 can determine which dipole radiator it is over and thus the longitudinal position of the aircraft with respect to the runway or runway approach can also be determined. However, since the fields obtained from the dipoles will, of course, be changing not only with the altitude of the aircraft but also with the movement along longitudinal axis 21 of the runway, it may be desirable to provide peak detector means in the detection circuitry for enabling the determination of the exact time when the aircraft is directly aligned with a particular pair of dipole radiators.

Figure 6:
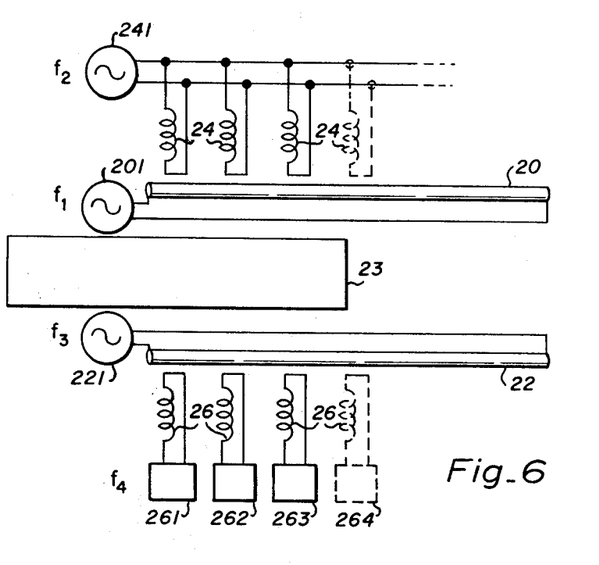
FIG. 6 is a schematic diagram of an electrical system for energizing the magnetic sources illustrated in FIG. 3.

A simplified magnetic field generation apparatus for location on the ground and compatible with the detection apparatus briefly described is schematically depicted in FIG. 6. The alternating-current power sources 201 and 221, operating at frequencies $f_1$ and $f_3$, respectively, drive linear conductors 20 and 22, respectively, to generate the magnetic fields 30 and 32 depicted in FIGS. 3 and 4. Alternating-current power source 241, operating at a frequency $f_2$ supplies the energy for dipole radiators 24 on the left side of the runway 23 while dipole radiators 26 are supplied with electrical energy from power sources 261–264. In this embodiment, each of the sources 261–64 emits a carrier signal having a frequency $f_4$, but the output of each source is modulated (pulse or otherwise) in some predetermined manner so that the fields created by the respective dipole correspond to particular longitudinal positions along the runway 23. For example, power source 261 can repetitively emit single bursts of the carrier signal having the frequency $f_4$, power source 262 can repetitively emit double bursts of the carrier signal, power source 263 can repetitively emit triple bursts of the carrier signal, etc.

Figure 7:
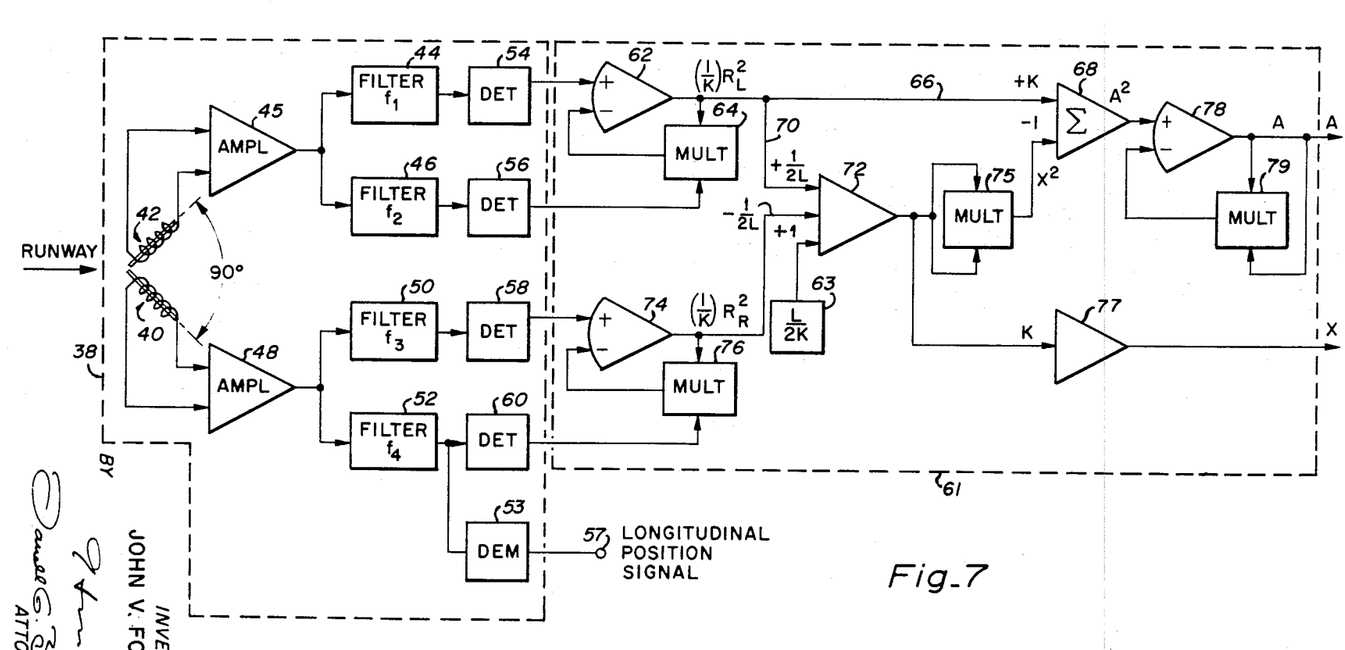
FIG. 7 is a schematic diagram of a detector and computing circuit in accordance with a preferred embodiment of the invention.

Referring now to FIG. 7, an exemplary embodiment of an onboard detection apparatus is illustrated wherein input section 38 includes detection transducers, signal-conditioning circuits and demodulators. Magnetic field detectors (magnetometers) 40 and 42 are disposed perpendicular to each other and oriented so that the sensitivity axis of detector 40 is directed toward the magnetic field sources on the left side of the runway and the sensitivity axis of detector 42 coincides with the magnetic field sources on the right side of the runway. For convenience, the simplest type of magnetometer, the search-coil type, is depicted. It comprises a coil of wire wound on a core of high-permeability material.

According to Faraday's law, a changing magnetic induction within the coils will produce electromotive forces (voltage) in the coils, which are proportional to the rate of change of induction. The sensitivity of a search-coil magnetometer increases with increasing frequency. Sensitivities of 0.01 gamma are feasible. Obviously, other types of magnetometers, such as resonance magnetometers, may be used for detectors 40 and 42.

The normal approach angle for a landing commercial aircraft is 3°, and the pilot normally maintains the wings of the aircraft horizontal (no roll). Under different landing conditions, it could be desirable to mount magnetometers 40 and 42 on a gimballed, servo-controlled, stable platform whereby they would be unaffected by the attitude of the aircraft.

The signals induced in magnetometer 42 by the fields generated on the right side of the runway are amplified by an amplifier 45 and are then passed through band-pass filters 44 and 46 which are centered on frequencies $f_1$ and $f_2$, respectively. Similarly, the signals detected in magnetometer 40 as a result of the magnetic fields generated on the left side of the runway are amplified by amplifier 48. Band-pass filters 50 and 52, centered on frequencies $f_3$ and $f_4$, respectively, are coupled to the output of amplifier 48. The four filter output signals can be used to compute the exact position of the aircraft 28 at any given time of flight.

Since the field strengths of the magnetic fields created by the linear conductors vary inversely with the distance R from the source, and the field strengths of the magnetic fields generated by the dipole sources vary inversely with the cube of the distance R, , i.e., $R_3$, it can be shown that the distance $R_r$ to the right conductor 20 may be expressed as $$R_r = e_{54}/e_{56} \quad (3)$$

where $e_{54}$ is the output of detector 54 and is proportional to the detected magnetic field created by the linear conductor 20, and $e_{56}$ is the output of detector 56 which is proportional to the detected magnetic fields created by the dipoles 24.

Likewise, the distance $R_1$ to the left conductor 22 can be expressed as $$R_1 = e_{58}/e_{60} \quad (4)$$

where $e_{58}$ is the output of detector 58 and is proportional to the detected magnetic field created by the linear conductor 22, and $e_{60}$ is the output of detector 60 which is proportional to the detected magnetic fields created by dipoles 26.

It is important to note here that when the signal powers generated by the linear and dipole conductors are fixed at the sources the distances $R_r$ and $R_1$ can be obtained independently and directly because of the particular ratio relationship between the detected electrical signals. The altitude A of the plane 28 can thus be obtained using the equation $$A = \sqrt{R_r^2 - (R_r^2 - R_1 + L^2)^2/4L^2}$$

and the lateral distance $x$ from the right conductor 20 can be determined by the equation $$X = R_r^2 - R_1^2 + L^2/L \quad (6)$$

This algebraic manipulation can be accomplished by the computer circuitry 61 shown in FIG. 7. The AC signals obtained from the filters 44, 46, 50, and 52 are envelope detected or demodulated by the detectors 54, 56, 58, and 60, respectively, to produce output signals suitable for manipulation by the computing circuitry. Demodulator 53 is coupled to output of filter 52. The demodulator strips off the dipole radiator position modulation coded on the carrier signal of $f_4$ frequency and produces a signal at output terminal 57 which is an analog of the longitudinal position. If the carrier is pulse modulated, for example, then demodulator 53 is a pulse demodulator which can generate an output signal proportional to the dipole distance along the runway.

The output of detector 54 is coupled into the positive input of a differential operational amplifier 62. The output of detector 56 is connected to one side of a multiplier 64, the other side of which is connected to the output of amplifier 62, and the multiplied output thereof is coupled into the negative input of the amplifier 62. The output of amplifier 62 is connected via line 66 to one input of a summing amplifier 68 and is also connected by a lead 70 to one input of the summing amplifier 72.

The output of the detector 58 is fed into the positive input of the differential operational amplifier 74 and the output of the detector 60 is fed into the multiplier 76, the output of which is fed into the negative input of the differential amplifier amplifier 74. The output of the amplifier 74 is coupled into a second input of the summing amplifier 72 along with a third input signal from voltage generator 63 which is proportional to L/2K where L is the distance between conductors 20 and 22 and K is a scaling factor. The symbols at the inputs of amplifier 72, amplifier 68, etc., are scaling factors. The output of the amplifier 72 is fed through another amplifying stage 77 to produce the desired X output. The output of the amplifier 72 is also coupled into a multiplier 75 the output of which is coupled to the summation amplifier 68. The output of the summing amplifier 68 is coupled into the positive input of a differential amplifier 78 the output of which produces the desired altitude responsive signal A.

This onboard computing network is therefore capable of detecting the magnetic fields produced by the longitudinal conductors and dipoles, and producing an altitude indication A, and a lateral offset indication X which manifests the proximity of the aircraft's path to the center line of the runway. These two signals can be used to operate a number of different types of height and lateral distance visual displays.

Figure 8:
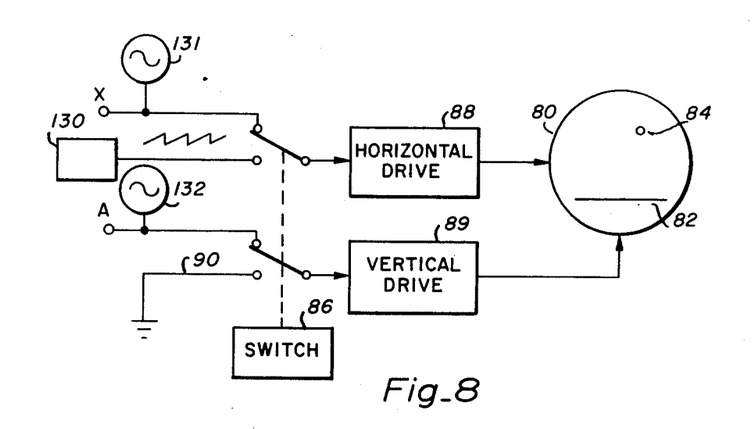
FIG. 8 is a schematic illustration of a visual position indicator apparatus in accordance with the present invention.

A simple display which indicates the height and lateral position of an aircraft with respect to a runway is illustrated in FIG. 8. In accordance with this embodiment, the horizontal and vertical sweep inputs of a cathode-ray tube 80 are driven so as to first represent a line 82 between the field sources and then to represent the aircraft position 84 as shown. This is accomplished by utilizing an electronic switch 86 to alternatively switch the input to horizontal drive 88 between the X input signal and a sawtooth sweep signal, representative of the runway width, obtained from sawtooth generator 130. The input to the vertical drive 89 is likewise switched between the A input and a zero voltage input 90. A small AC signal is added to each of the X and A signals, by means of AC signal generators 131 and 132, respectively. The signals from the generators are equal, of the same frequency, and 90° out of phase so that the aircraft position will be represented by a small Lissajous circle as shown at 84. Of course, the diameter of the circle is dependent on the amplitude of signals emitted from generators 131 and 132.

Figure 9:
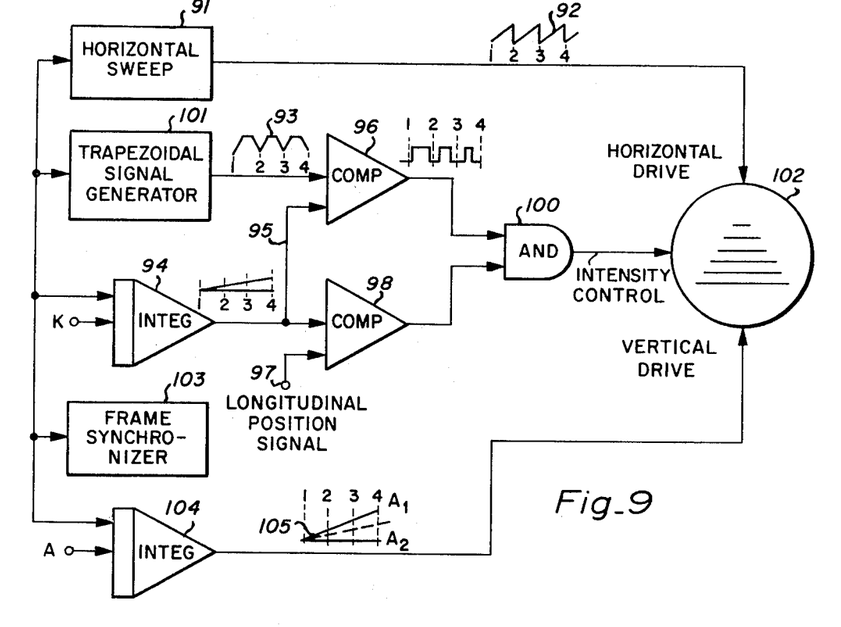
FIG. 9 is an alternative schematic illustration of a visual position indicator apparatus in accordance with the present invention.

Still another example of a visual indication for representing the longitudinal position of an aircraft with respect to a runway is illustrated in FIG. 9. The required input signals are a standard sawtooth horizontal sweep, a trapezoidal wave, the longitudinal distance signal from one of the coded dipole sources, and the computer height signal A. A repetitive horizontal sweep sawtooth signal 92 is produced by the horizontal sweep generator 91 and a corresponding repetitive trapezoidal signal 93 is produced by a generator 101.

A constant voltage K supplied to the input of integrator 94 produces a slowly rising voltage 95 over several periods of the repetitive sweep. The trapezoidal output 93 of generator 101 is compared with the slowly rising signal 95 in the comparator 96 which generates a signal only when the trapezoid is higher than the slowly rising signal 95. Consequently, the output of the comparator 96 is a series of pulses of widths decreasing with each cycle.

In another portion of the circuit the slowly rising voltage output 95 of integrator 94 is compared to the longitudinal position or distance signal 97 developed from the coded dipole signals. The comparator 98, in response to these two inputs, produces an output as long as the distance signal is higher than the slowly rising signal 95. The distance signal is proportional to the distance from the desired touchdown point so that at a long distance therefrom, the comparator 98 produces output signals over several repetitive sweeps with a decreasing number of output signals as the distance to the touchdown point decreases.

The outputs of the comparators 96 and 98 are fed through an AND-gate 100 which produces an output signal only when a positive signal exists in the outputs of both comparators 96 and 98. The AND gate signal controls the intensity of the cathode-ray tube 102 turning on the beam at the appropriate times. The vertical drive signal for the CRT 102 is generated by supplying a voltage proportional to the computed aircraft height A to an integrator 104. This generates a linearly rising voltage 105 with the rate of rise proportional to the altitude A. Frame synchronizer 103 synchronizes the generation of waveforms of horizontal sweep 91, trapezoidal signal generator 101, integrator 94 and integrator 104. It also clears the integrators at the end of each CRT frame.

Figure 10:
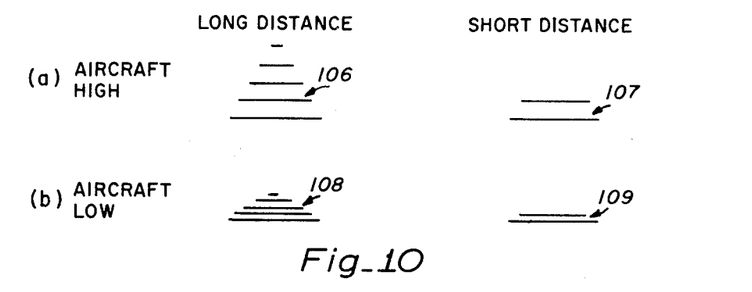
FIG. 10 illustrates the types of indicia provided by the system of FIG. 8.

The types of outputs produced by such a circuit are illustrated in FIG. 10 of the drawings. Where the aircraft is a long distance from the touchdown point, or the end of the runway, and is high above the runway this will be indicated by a series of lines 106 as shown in part (a). As the aircraft approaches the touchdown point, or the end of the runway, the number of lines decreases as shown at 107. In part (b), the oscilloscope display is illustrated for both long distances 108 and short distances 109 from the touchdown point, when the aircraft is low over the runway. It will be apparent that this type of indication alone not only indicates the distance from the touchdown point but also the height of the plane above the runway.

Figure 11:
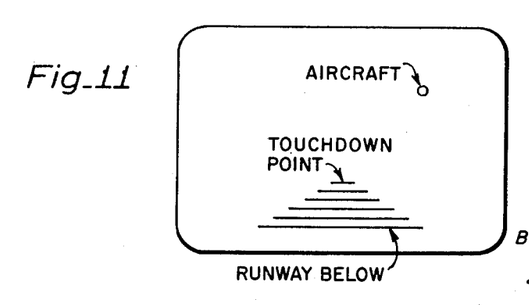
FIG. 11 illustrates a visual display provided by combining the systems of FIGS. 7 and 8.

By combining the two CRT displays illustrated in FIGS. 8 and 9 of the drawings, a composite readout such as is shown in FIG. 11 of the drawings can be obtained.

Figure 12:
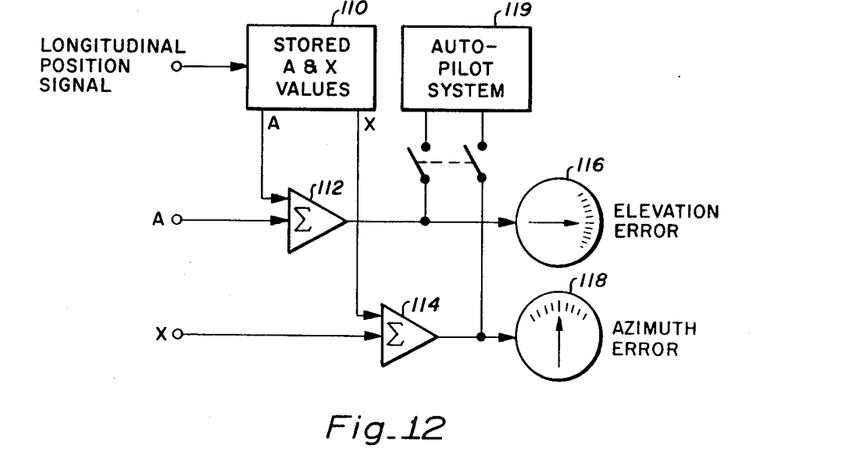
FIG. 12 illustrates an ILS position error indicator and autopilot system in accordance with the present invention.

FIG. 12 schematically illustrates another visual display embodiment. Information is displayed in a manner similar to the standard ILS system. Referring to FIG. 12, a predetermined set of A and X values, representative of the desired approach path, are initially programmed into a storage means 110 and these values are extracted in response to a longitudinal position signal obtained as the aircraft crosses over the respective dipole sources. The stored A and X signals are then compared with the computed A and X signals in comparators 112 and 114 respectively, and are used to drive elevation error and azimuth error meters 116 and 118 and/or an autopilot system 119.

Whereas the above-described system has been illustrated as having the magnetic sources limited to ground location and the magnetic detectors as airborne equipment, it is contemplated that a magnetic signal source or sources could just as well be carried by the aircraft for detection by a plurality of search coils located at various positions along the runway or glide path in order to provide a simple ground-controlled approach system. Moreover, the position detection system of the present invention is not to be limited to the field of aircraft position detection alone, but is equally applicable to the guidance of any other type of land or sea vehicle or conveyance.

An examination of a number of aircraft accident reports has revealed that many landing accidents have resulted from the pilot's failure to observe his altitude instruments or, in some instances, believe what they indicate. It appears that over the above the visual indicators in the cockpit and his visual perception of the approaching runway, the pilot needs a system which will operate an alarm whenever the aircraft reaches or drops below a minimum-safety flight path.

Figure 13:
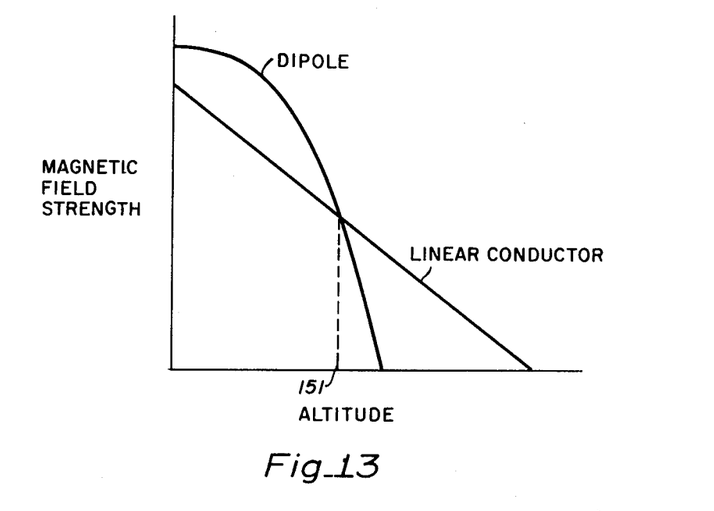
FIG. 13 is a diagram illustrating the magnetic field strengths obtainable at the various altitudes using dipole and linear conductor magnetic sources.

FIG. 13 graphically illustrates the relationship between field strength and altitude (distance) for two types of magnetic field sources—a dipole and a linear conductor. Note the strength of the linear conductor field drops linearly with increasing altitude, whereas the strength of the dipole field decreases exponentially (varies inversely with the cube of the altitude). There is only one altitude 151 where the field strengths are equal. By adjusting the field strength of the dipole with respect to the field strength of the linear conductor, or vice versa, it is apparent that the altitude crossover point can be positioned as desired.

In still another embodiment of the invention illustrated in FIGS. 14 and 15, the above-described crossover feature is employed to provide an "electronic fence" system that audibly warns the pilot when the aircraft is below a prescribed minimum safety landing approach path. In accordance with this system, a number of linear conductors 160 are disposed parallel to each other and perpendicular to the longitudinal axis 158 of the runway 159. The conductors are placed in front of the runway and they may, if desired, overlap it a small amount. The conductors may be placed in the plane of the runway, or above it, or below it. Of course, if they are elevated too much above the runway, they will become a hazard for the landing aircraft.

Spaced along and adjacent to each linear conductor 160 are a number of dipole radiators 163. The longitudinal axes of the dipole radiators 163 are generally parallel to the plane of the runway 159 and perpendicular to the linear conductors 160. The overall field generated at station 165 by the dipoles 163 and the linear conductor 160 is substantially cylindrical and comprised of transverse semicylindrical fields 161 and the overlapping dipole fields 162. Likewise, the magnetic field at stations 166 and 167 are also substantially cylindrical. Path 168 represents the normal flight path of aircraft 170 using runway 159. Path 169 depicts the minimum safe flight path for aircraft landing at runway 159.

If the minimum flight path is, for example, 100 feet over conductor 160 at station 165, then the strengths of the fields at station 165 are adjusted so that they are equal 100 feet above conductor 160 (and dipole radiators 163). Similarly, the fields of station 166 and other stations are adjusted so that the crossover point coincides with the minimum flight path 169.

Figure 16:
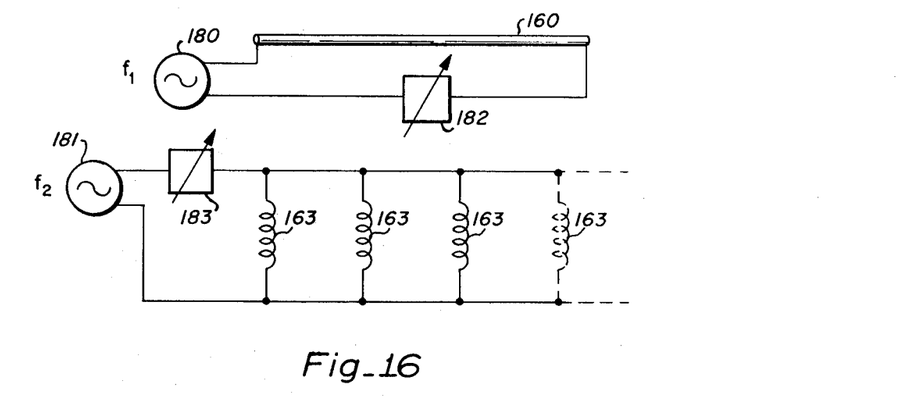
FIG. 16 is a schematic diagram of a simple dipole and linear conductor energizing system in accordance with the present invention.

FIG. 16 schematically illustrates in simplified schematic form an electrical circuit for each station of the alarm system. An alternating-current power source 180 operating at frequency $f_1$ provides electrical energy for linear conductor 160. Adjustable impedance 182 varies the amount of current through the conductor and thus the strength of the field produced by the conductor. Dipole radiators 163 are connected in parallel and fed by alternating-current power source 181 having a frequency $f_2$. Adjustable impedance 183 controls the amount of current through the dipole radiators. If desired, additional impedances can be series connected to one or more of the individual dipole radiators to tailor the overall field generated by the dipoles.

Figure 14:
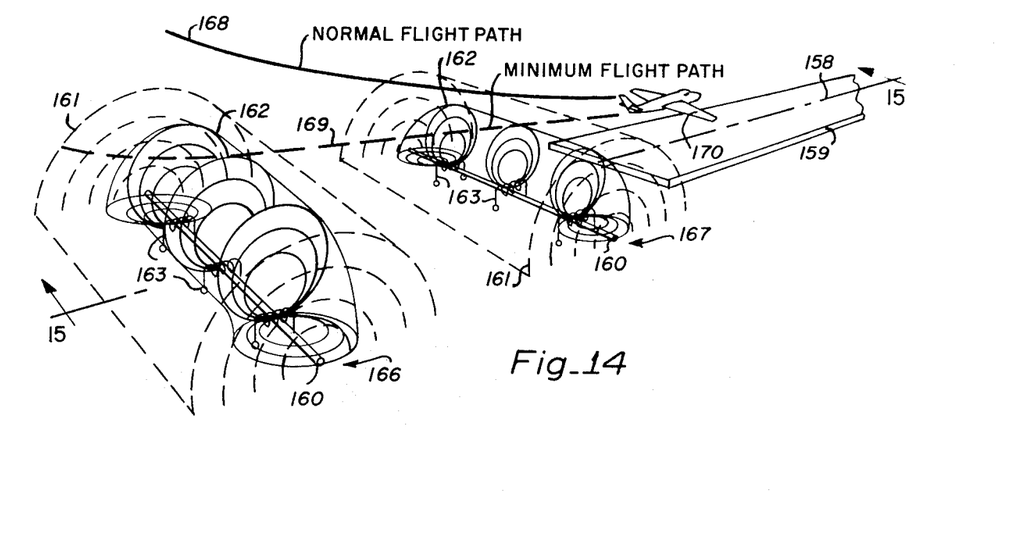
FIG. 14 illustrates a magnetic glide slope monitoring system in accordance with the present invention.
Figure 15:
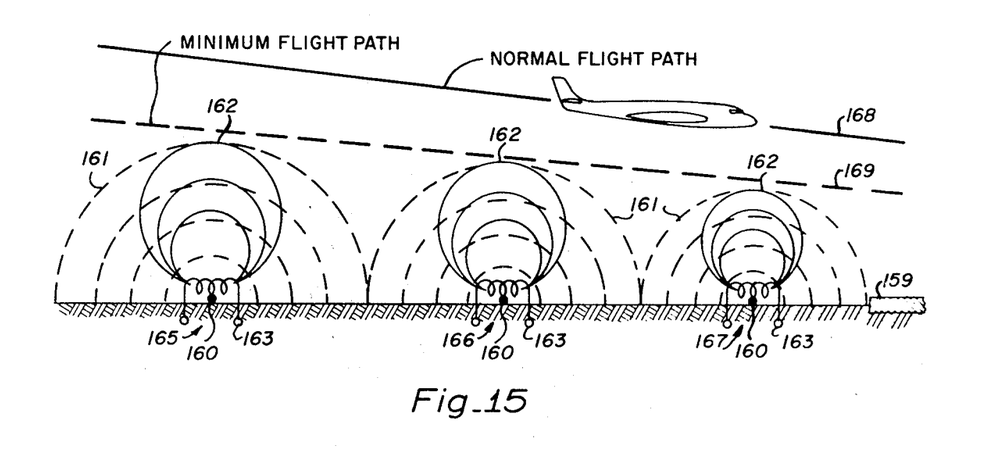
FIG. 15 is a longitudinal cross section taken along the center line of the runway and glide path illustrated in FIG. 14.
Figure 17:
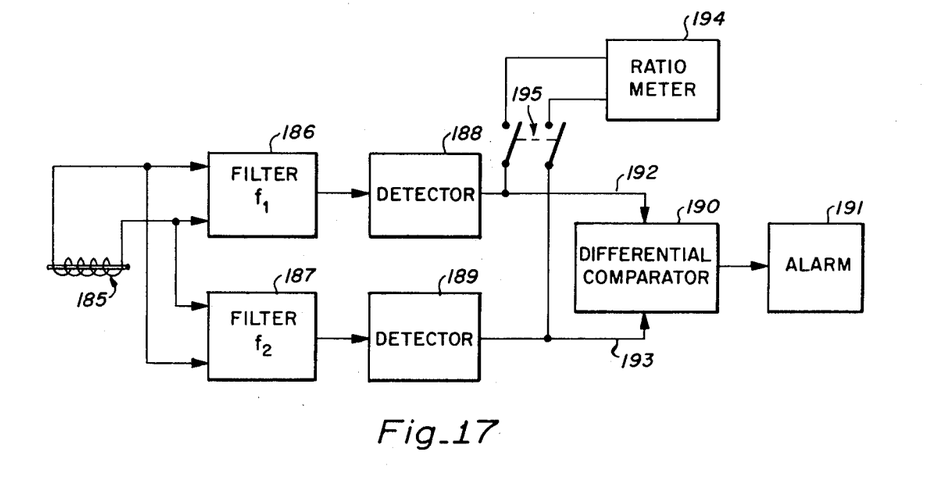
FIG. 17 is a simplified block diagram of an airborne detection system for use in detecting the magnetic glide path indicia produced by the system illustrated in FIGS. 14 and 15.

FIG. 17 schematically illustrates a suitable receiver system for use on aircraft flying over the magnetic field stations depicted in FIGS. 14 and 15. A magnetometer 185 is coupled to band-pass filters 186 and 187. The magnetometer, which may be of the search-coil variety comprising a coil and a high-permeability core, is disposed in the aircraft so as to be sensitive to both the dipole fields and the fields generated by the linear conductors. A suitable orientation will be achieved if the longitudinal axis of the magnetometer is parallel to the longitudinal axis of the aircraft. Filter 186 is centered on frequency $f_1$ whereas filter 187 is centered on frequency $f_2$.

Detectors 188 and 189 are coupled to the outputs of filters 186 and 187, respectively. The outputs of the two detectors are connected to a differential comparator 190 which in turn is coupled to an alarm 191. A ratio meter 194 is also connected to the outputs of detectors 188 and 189. A DPST switch 195 is interposed between the detectors and the ratio meter 194. Alarm 191 preferably generates an audible tone in the cockpit of the aircraft. If desired, a visual indicator such as a flashing red panel light may be combined with the tone generator or substituted therefore.

In operation, signals of frequencies $f_1$ and $f_2$ are induced in magnetometer 185 as the magnetometer is immersed in the magnetic fields generated by a linear conductor and its associated dipole radiators. The amplitude of the signal having a frequency $f_1$ is proportional to the field strength of the linear conductor and the amplitude of the signal having a frequency $f_2$ is proportional to the field strength of the dipoles. Filter 186 passes the linear-conductor-derived signal. Filter 187 acts in the reverse passing the dipole-derived signal to detector 189. The AC signals sent into the detectors are demodualted therein and converted to DC signals. The DC signal on lead 192 is thus representative of the field strength of the linear conductor whereas the signal on lead 193 is representative of the field strength of the dipole radiators.

Whenever the signal on lead 193 is equal to or greater than the signal on lead 192, alarm 191 is turned on. An operative alarm indicates that the aircraft has reached or dropped below the minimum safety path 169. When the switch 195 is closed, the ratio of the field strengths can be read directly on ratio meter 194. This enables the pilot to determine the actual distance to the magnetic field sources. The meter can be calibrated in terms of ratio and/or distance.

Whereas the embodiment described above in FIGS. 14, 15, 16, and 17, provides a single "electronic fence," it should be apparent that the principles of the invention may be employed to provide multiple fences around the approaching aircraft. Specifically, additional fences can be provided on the top, left, or right side of the aircraft. If complete four-side protection is desired, the fences would in effect form a tunnel. Furthermore, this electronic fence embodiment may be combined with the previously described magnetic system to provide a combination glide slope and lateral position determining system.

After having read the above description, many modifications and alterations of the present invention will become apparent to those skilled in the art which will not actually depart from the merits of the invention. It is, therefore, to be understood that I intend for the appended claims to be interpreted in accordance with the true spirit and scope of the invention and not to be limited by the particular illustrative embodiments disclosed.

What is claimed is:

1. Apparatus for measuring the distance between a vehicle and a reference station comprising:
    means at said reference station for generating a first magnetic field the field strength of which varies inversely with the distance from said reference station;
    means at said reference station for generating a second magnetic field the field strength of which varies inversely with the $n$th power of the distance from said reference station where $n$ is a number greater than one;
    means carried by said vehicle for measuring the field strength of said first magnetic field;
    means carried by said vehicle for measuring the field strength of said second magnetic field; and
    means coupled to both of said measuring means for determining the ratio between said field strengths, said ratio being representative of the distance between said vehicle and said reference station.

2. Distance-measuring apparatus comprising:
    a transmitter comprising means for generating a first magnetic field and means for generating a second magnetic field, the field strength of said first magnetic field varying inversely with the distance from said transmitter, the field strength of said second magnetic field varying inversely with the cube of the distance from said transmitter; and
    a receiver remote from said transmitter immersed in both of said magnetic fields, said receiver comprising means for detecting the ratio of the field strengths of said first and second magnetic fields, said ratio being representative of the distance between said transmitter and said receiver.

3. A method for determining the distance between a first point and a second point comprising the steps of:
    generating at said first point a first time-varying magnetic field of a predetermined strength which varies inversely with range;
    generating at said first point a second time-varying magnetic field of a predetermined strength which varies inversely with the cube of the range;
    detecting the magnetic field strengths of the fields at said second point; and
    determining the ratio of the respective field strengths as a measure of the distance between said first point and said second point.

4. A vehicle position detection apparatus comprising first and second elongated electrical conductors;
    a first set of means for generating magnetic dipoles each having a longitudinal axis, said dipoles being disposed in spaced-apart relation along said first conductor;
    a second set of means for generating magnetic dipoles each having a longitudinal axis, said dipoles being disposed in spaced-apart relation along said first conductor;
    means for energizing each conductor with an alternating current so as to generate a magnetic field from each conductor;
    the field strength of each of said conductor magnetic fields varying inversely with the range from said conductor,
    the field strength of each of said magnetic dipoles varying inversely as the cube of the range from said dipole;
    means on said vehicle for measuring the ratio of magnetic field strengths between said conductor fields and said dipole fields to determine the instantaneous location of said vehicle with respect to said conductors and said dipoles.

5. A vehicle position detection apparatus as recited in claim 4 wherein said first and second conductors are linear and parallel to each other and located near the intended path of said vehicle.

6. A vehicle position detection apparatus as recited in claim 5 wherein the axes of said dipoles are orthogonal to said linear conductors and inclined at a predetermined angle relative to the plane defined by said parallel linear conductors.

7. A vehicle position detection apparatus as recited in claim 6 wherein the dipoles of said first set are respectively opposite the dipoles of said second set so as to form dipole pairs which are spaced at predetermined distances relative to the intended path of said vehicle.

8. A vehicle position detection apparatus as recited in claim 7 wherein equal strength fields are generated from said linear conductors and equal strength fields are generated from said dipoles.

9. A vehicle position detection apparatus as recited in claim 8 wherein said first linear conductor field has a frequency $f_1$, said second linear conductor field has a frequency $f_2$, said first set of magnetic dipoles has a frequency $f_3$, and said second set of magnetic dipoles has a frequency $]f_4$.

10. A vehicle position detection apparatus as recited in claim 9 wherein each of said magnetic dipoles in said second set is distinctively modulated, and said detector means has demodulation means for determining the dipole to which it is nearest and generating a longitudinal position signal indicative of the longitudinal position of said vehicle along said intended path.

11. A vehicle position detection apparatus as recited in claim 5 wherein said vehicle is an aircraft, said first and second linear electrical conductors are normal to the intended path of said aircraft, said linear conductors and said dipoles are disposed at one end of a runway, and said linear conductors and said dipoles are energized so as to provide contoured magnetic fields that decrease in field strength as the end of said runway is approached.

12. A vehicle position detection apparatus as recited in claim 5 wherein said vehicle is an aircraft, said linear conductors are alongside a runway, said detector means includes display means for displaying symbols representative of said aircraft and said runway, said symbols being space oriented so as to show the instantaneous position of said aircraft relative to said runway.

13. A vehicle position detection apparatus as recited in claim 5 wherein said vehicle is an aircraft, said linear conductors are alongside a runway, said detector means includes a cathode-ray tube for displaying symbols representative of said aircraft and said runway, said aircraft being represented by a circle and said runway being represented by horizontal parallel lines, the number of which decreases as the touchdown point is approached.

14. A vehicle position detection apparatus as recited in claim 10 wherein said vehicle is an aircraft, said first and second linear conductors are alongside a runway, said detector means includes a computer means for providing a first output signal indicative of the instantaneous altitude of said aircraft above said runway and a second output signal indicative of the lateral position of said aircraft with relation to said runway.

15. A vehicle position detection apparatus as claimed in claim 14 further including a storage and comparison means for storing an optimum glide path and instantaneously comparing it with said longitudinal position signal, said altitude signal and said lateral position signal, and readout means coupled to said storage and comparison means for indicating the elevation error and the lateral error from said optimum glide path.

16. A vehicle position detection apparatus as claimed in claim 14 further including a storage and comparison means for storing an optimum glide path and instantaneously comparing it with said longitudinal position signal, said altitude signal and said lateral signal, and servo means coupled to said storage and comparison means for maintaining said aircraft on said optimum glide path.

17. An instrument landing system for an aircraft comprising:
a runway having a longitudinal axis,
$n$ linear and parallel electrical conductors spaced apart and adjacent one end of said runway and normal to said runway longitudinal axis;
a set of magnetic dipoles distributed along each linear conductor, said dipoles each having a longitudinal axis disposed normal to its respective linear conductor;
means for energizing each linear conductor with an alternating current so as to generate a magnetic field from each conductor;
the field strength of said of said linear conductor magnetic fields varying inversely with the range from said conductor;
the field strength of each of said magnetic dipoles varying inversely as the cube of the range from said dipole;
means for adjusting the relative field strengths to conform to a predetermined equal-strength locus;
detector means on said aircraft for measuring the ratio between said linear conductor field strength and said dipole field strength, said ratio being representative of the distance said aircraft is from said locus.

18. An instrument landing system as recited in claim 17 wherein said linear conductor fields have a frequency $f_1$, said dipole fields have a frequency $f_2$, said locus corresponds to the minimum safe aircraft glide path, and said detector means includes an alarm that sounds whenever said aircraft flies on or below said minimum safe glide path.

* * * * *